United States Patent [19]

Mercurio

[11] Patent Number: 4,792,248
[45] Date of Patent: Dec. 20, 1988

[54] INSTALLATION TOOL FOR COIN BOX DROP

[75] Inventor: Leonard Mercurio, Dix Hills, N.Y.

[73] Assignee: Set-O-Matic, Inc., Farmingdale, N.Y.

[21] Appl. No.: 131,564

[22] Filed: Dec. 11, 1987

[51] Int. Cl.⁴ .............................................. B23C 1/20
[52] U.S. Cl. .................................... 409/178; 409/204; 409/228; 29/564
[58] Field of Search ............... 409/178, 204, 205, 219, 409/228, 166; 29/564

[56] References Cited

U.S. PATENT DOCUMENTS 3,918,145  11/1975  Oglevie et al. ........................ 29/564
4,009,431  7/1978   Kreucher ............................. 409/166

Primary Examiner—Leon Scott, Jr.
Attorney, Agent, or Firm—Charles E. Temko

[57] ABSTRACT

A milling tool adapted to be mounted upon an existing supporting frame for a coin box for the purpose of enlarging an existing slot or opening in the frame at a predetermined location. The tool includes a mounting element which is temporarily secured to the support frame on a first wall thereof, and a rotating tool, the operative end of which projects through the wall to engage a second wall at right angles thereto, the second wall having an existing opening to be englarged. The rotating part of the tool is pivoted about an axis perpendicular to the axis of rotation during operation to permit cutting of an accurately defined area.

3 Claims, 1 Drawing Sheet

U.S. Patent  Dec. 20, 1988  4,792,248
FIG. 1.
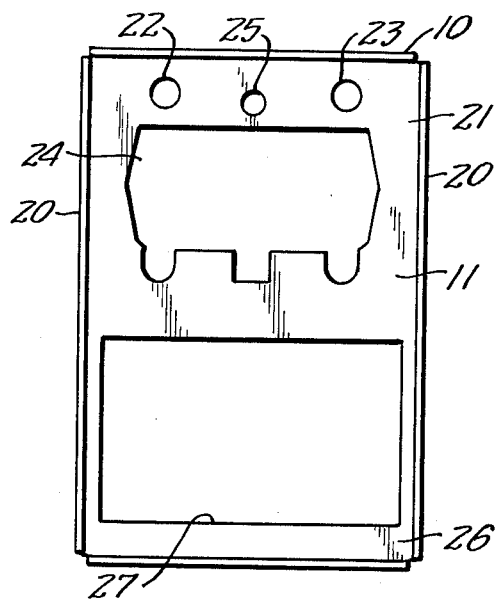
FIG. 2.
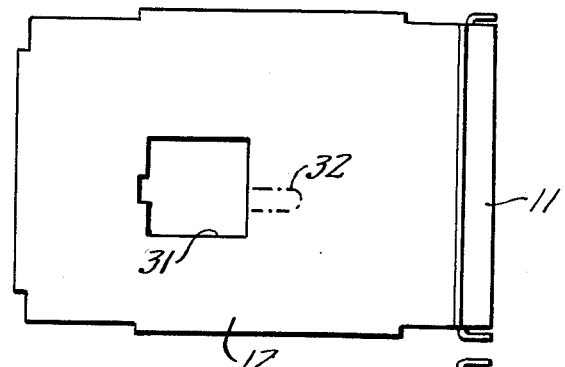
FIG. 3.
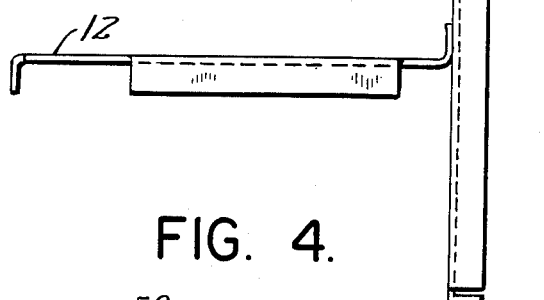
FIG. 4.
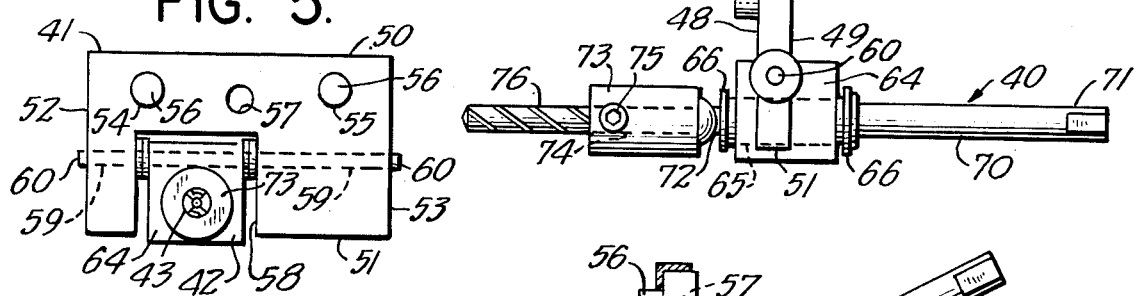
FIG. 5.
FIG. 6.
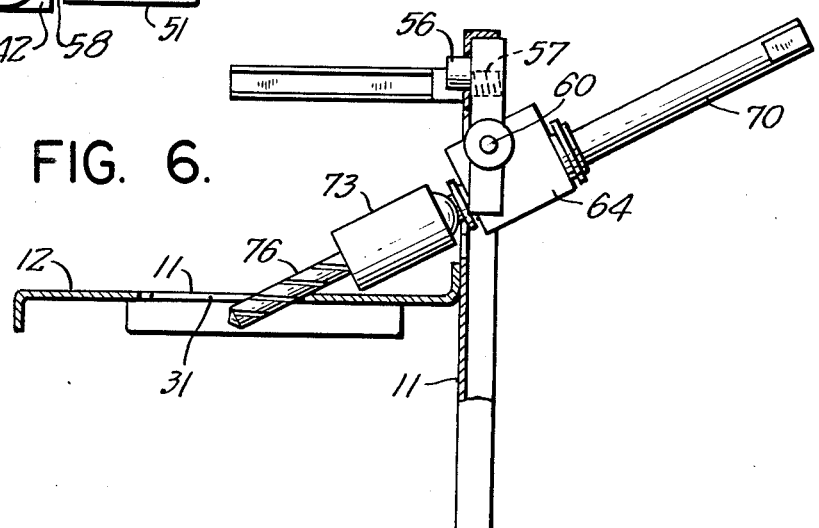

4,792,248

INSTALLATION TOOL FOR COIN BOX DROP

BACKGROUND OF THE INVENTION

This invention relates generally to the field of specialized tools, and more particularly to an improved tool for installing an improved coin acceptor in a coin-operated device such as a commercial laundering machine, dryer, or the like.

Such devices are traditionally provided with a coin acceptor of the coin slide type in which coins are positioned upon the slide to permit the slide to be moved inwardly to commence operation. At an innermost point on the path of travel, the coins are dropped into a chute, following which the slide returns to its initial position. More recently, there have been developed improved electronic devices which perform the same function in the absence of a coin slide and which allow more flexibility in the ability to accept large numbers of coins for the commencement of each cycle.

The replacement of the coin slide with the electronic device can be accomplished without great difficulty, but in such replacement, the location of the coin chute or slot leading to a collection box is displaced relative to the former location, and the opening in a plate supporting the device and disposed above the coin box must be either enlarged, or a new slot-like opening formed. Where large numbers of such coin-operated machines are converted, it is desirable to provide a specialised simple tool which will conveniently enlarge the coin slot opening without excess cutting, and with minimum effort on the part of the installer.

SUMMARY OF THE INVENTION

Briefly stated, the invention contemplates the provision of an improved tool of the class described which may be selectively interconnected to a wall of an existing coin box enclosure to accurately located cutting bit at a precise location in a second wall to cut the required coin slot opening, or to enlarge an existing opening provided for the same purposes. To this end, there is provided a tool having a relatively stationary flat element adapted to abut the first mentioned forward wall of the coin box enclosure, and having projections adapted to engage existing openings in that wall. The relatively stationary element pivotally supports a rotating shaft having a cutting tool bit at one end thereof, and means at an opposite end for engagement by the chuck of a powered hand drill or the like. During the cutting operation, the rotating shaft pivots on an axis perpendicular to the axis of rotation of the shaft to move the cutting tool in a predetermined arcuate path to control the degree of cutting of the above-mentioned elongated slot.

BRIEF DESCRIPTION OF THE DRAWINGS

In the drawings, to which reference will be made in the specification, similar reference characters have been employed to designate corresponding parts throughout the several views.

FIG. 1 is a front elevational view of an internal frame element forming part of a coin box.

FIG. 2 is a top plan view thereof.

FIG. 3 is a side elevational view thereof.

FIG. 4 is an end elevational view of an embodiment of the invention.

FIG. 5 is a side elevational view thereof.

FIG. 6 is a side elevational view of the structure shown in FIG. 3, partly in section, in engaged condition with the structure shown in FIG. 1.

DETAILED DESCRIPTION OF THE DISCLOSED EMBODIMENT

In accordance with the invention, and with reference to FIG. 1, there is illustrated an existing form of coin box housing, generally indicated by reference character 10 normally provided for a coin slide type of coin receiver. It includes a forward facing wall 11 which is vertically oriented, a horizontal wall 12 disposed inwardly thereof to provide an upper recess 13 in which the coin slide is disposed, and a lower recess 14 which contains a coin box (the coin slide and coin box being conventional, and not illustrated).

The forwardly facing wall 11 includes a peripheral flange 20. An upper portion 21 includes first and second circular openings 22 and 23, a larger irregularly shaped opening 24, and a third circular opening 25 which are already present to enable mounting of the existing coin slide structure (not shown). A lower portion 26 forms a large rectangular opening 27 through which the coin box may be withdrawn.

The horizontal wall 12 is preferably welded at a forward edge thereof to the wall 11, and includes an upper surface enclosing a rectangular pre-existing opening 31, which must be enlarged to include the area 32 indicated in dashed lines, in order to accommodate the electronic coin acceptor.

The device embodying the invention, is generally indicated by reference character 40, and is shown in detached condition in FIGS. 4 and 5 in the drawing. It comprises a relatively fixed attaching element 41, a pivoted support element 42, and a rotating shaft element 43.

The attaching element may be formed from molded synthetic resinous material, and is in the form of a generally rectangularly configured blank bounded by first and second planar surfaces 48 and 49, respectively, an upper edge 50, a lower edge 51, and first and second side edges 52 and 53, respectively. Transversely extending first and second bores 54–55 are fitted with cylindrical locating pins 56 which are adapted to engage the circular openings 22 and 23. A threaded bore 57 thereby becomes aligned with the third opening 25 in the wall 11, and permits the temporary fastening of the device 40 to the wall 11 by threaded means (not shown). Extending downwardly from the upper edge 50 is a rectangular recess 58 communicating with transversely extending bores 59 which support a shaft 60 passing through the support element 42.

The support element 42 includes a rectangular block of materials 64 trunnioned on the shaft 60, and including an axially arranged through bore 65 with bearings 66. It is capable of limited pivotal movement only, to provide means for governing the degree of cutting to be accomplished by the shaft element 43.

The shaft element 43 includes an elongated shaft 70 having an outer end 71 adapted to be engaged by the chuck of a hand drill (not shown) and an inner end 72 provided with an elongated collar 73 having a centrally disposed bore 74 and set screw 75 which provide means for supporting a milling tool 76.

Operation of the device will be apparent from a consideration of FIG. 6, wherein the existing coin box housing (not shown) has been removed and opened to allow removal of the coin slide mechanism disposed therebeneath. The device 40 is then engaged with the wall 11, and if necessary, it may be maintained using a threaded nut (not shown) projecting through the opening 25 and engaging the threaded bore 57. This will position the device such that the tool 76 will overlie the upper surface of the horizontal wall 12, adjacent the already existing opening 31. Rotation of the shaft 70, and pivoting the same about the shaft 60 clockwise as seen in the drawing, will enable the slot 32 to be accurately machined to the extent necessary, following which the device 40 may be disconnected and the positioning of the electronic coin receptor accomplished.

I wish it to be understood that I do not consider the invention limited to the precise details of structure shown and set forth in this specification, for obvious modifications will occur to those skilled in the art to which the invention pertains.

I claim:

1. An improved tool for machining a planar wall of an existing structure, said structure including said wall and a second wall disposed at right angles thereto, said second wall having existing openings therein, said tool comprising: a relatively fixed attaching element, a support element pivotally secured to said attaching element for limited pivotal movement with respect thereto, and a rotating shaft element journaled for rotation within said support element; said attaching element including means thereon selectively engaging at least some of said openings in said second wall to orient said attaching element in fixed relation thereto, engagement serving to position said rotating shaft element within another of said openings in said second wall with a first end thereof overlying said first wall, and a second end projecting outwardly of said first wall element for engagement with prime mover; said first end having a cutting tool thereon; whereby, upon rotation of said rotary shaft element, and the pivoting of said support element relative to said attaching element, said tool may cut an opening in said first wall of predetermined elongated configuration.

2. An improved tool as set forth in claim 1, further characterized in said tool being a rotating milling cutter.

3. An improved tool as set forth in claim 1, further characterized in said means on said attaching element being in the form of projecting pins.

* * * * *